US012704858B2

(12) United States Patent
Kim et al.

(10) Patent No.: US 12,704,858 B2
(45) Date of Patent: Aug. 11, 2026

(54) DRIVING ROUTE GENERATION METHOD AND SYSTEM

(71) Applicant: HYUNDAI MOBIS CO., LTD., Seoul (KR)

(72) Inventors: Hyeon Guk Kim, Hwaseong-si (KR); Young Gi Jung, Suwon-si (KR); So Yeon Kim, Suwon-si (KR); Il Yong Eom, Seongnam-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 143 days.

(21) Appl. No.: 18/426,567

(22) Filed: Jan. 30, 2024

(65) Prior Publication Data

US 2024/0345602 A1 Oct. 17, 2024

(30) Foreign Application Priority Data

Apr. 13, 2023 (KR) ........................ 10-2023-0048794
Apr. 14, 2023 (KR) ........................ 10-2023-0049404

(51) Int. Cl.
*G05D 1/693* (2024.01)
*G05D 1/633* (2024.01)
*G05D 1/646* (2024.01)
*G05D 107/70* (2024.01)

(52) U.S. Cl.
CPC ............. *G05D 1/693* (2024.01); *G05D 1/633* (2024.01); *G05D 1/646* (2024.01); *G05D 2107/70* (2024.01)

(58) Field of Classification Search
CPC ........ G05D 1/644; G05D 1/021; G05D 1/693; G06F 30/20; G06F 30/15; G06F 11/3698; G06Q 10/047; G08G 1/20; G06N 20/00; G06N 3/09; B60W 60/001
See application file for complete search history.

(56) References Cited

U.S. PATENT DOCUMENTS 10,402,771 B1 * 9/2019 De ........................... G08G 1/20
10,877,476 B2 * 12/2020 Liu ..................... G06F 11/3698
2017/0372431 A1 * 12/2017 Perl ...................... G06Q 10/047
2019/0163182 A1 * 5/2019 Li ........................... G06F 30/15
2020/0125102 A1 * 4/2020 Jiang ...................... G05D 1/021
2024/0416961 A1 * 12/2024 Du .......................... G06F 30/20

FOREIGN PATENT DOCUMENTS

JP 2020042786 A * 3/2020 ............. G06N 20/00
WO WO-2021157758 A1 * 8/2021 ............... G06N 3/09

* cited by examiner

*Primary Examiner* — Yuri Kan
(74) *Attorney, Agent, or Firm* — NSIP Law

(57) ABSTRACT

A method of generating driving routes of a plurality of mobile robots including generating a plurality of virtual driving lines in a driving space, generating a pattern of driving behaviors of the mobile robots based on the plurality of generated virtual driving lines, inputting an initial position and a final position of each of the plurality of mobile robots, and generating respective driving routes from the initial position to the final position of each of the plurality of mobile robots on the plurality of generated virtual driving lines based on the generated pattern of the driving behaviors.

11 Claims, 14 Drawing Sheets

DRIVING ROUTE GENERATION METHOD AND SYSTEM

CROSS REFERENCE TO RELATED APPLICATIONS

This application claims the benefit under 35 U.S.C. § 119(a) of Korean Patent Application No. 10-2023-0048794, filed on Apr. 13, 2023, and No. 10-2023-0049404, filed on Apr. 14, 2023, the entire disclosures of which are incorporated herein by reference for all purposes.

BACKGROUND

1. Field

The present disclosure relates to a driving path generation method and system for efficiently generating driving routes of multiple mobile robots by patterning the driving behavior of the mobile robots in a driving space.

2. Description of the Related Art

With the development of technology, many tasks in the industrial field are being automated. In one example, multiple mobile robots may drive and perform tasks in a workspace. In this case, it is important to generate a driving route such that the multiple mobile robots can travel to a desired destination without encountering collisions.

There are two main methods of generating driving routes for multiple mobile robots. One is the decoupled method, and the other is the centralized method.

The decoupled method is to generate the driving route of each mobile robot individually, and then detect the collision between the mobile robots and modify the driving route or control the speed to avoid the collision.

The decentralized method has the advantage of reducing the amount of computation during the driving route generation process, but it is difficult to ensure the optimality of the driving route. In addition, adjusting the speed of the mobile robots may reduce the efficiency of the task, or cause the multiple mobile robots to get stuck in a deadlock and fail to achieve the desired task.

An alternative method, the centralized method, is to generate the driving routes of all mobile robots simultaneously in a single cycle, and to consider the number of cases related to all other mobile robots in generating the driving route for each mobile robot.

The centralized method has the advantage of generating optimal driving routes. However, since the number of cases related to the other mobile robots is considered in generating the driving route of each mobile robot, the amount of computation may increase exponentially as the number of mobile robots increases, which makes it unsuitable to apply the method to a large number of mobile robots.

In addition, even if the optimal driving route is generated by considering the driving routes of all mobile robots in advance, the driving time of the mobile robot during actual driving may be different from that calculated in advance due to obstacles on the driving route or delays in the task, which may cause a decrease in the performance of the control system because the aforementioned calculation complexity continues to occur during the driving of multiple mobile robots.

Also, abnormal situations may occur when multiple mobile robots are traveling within a task space. For example, even if the optimal driving route is generated by considering the driving routes of all mobile robots in advance, the driving time of the mobile robot during actual driving may be different from that calculated in advance due to obstacles on the driving route or delays in work. In addition, if such abnormal situations occur, collisions or deadlocks may occur in the actual driving process of multiple mobile robots after the driving routes are generated.

Therefore, there is a need for a means for efficiently generating driving routes of multiple mobile robots in a driving space while addressing the issues described above.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, here is provided a method of generating driving routes of a plurality of mobile robots including generating a plurality of virtual driving lines in a driving space, generating a pattern of driving behaviors of the mobile robots based on the plurality of generated virtual driving lines, inputting an initial position and a final position of each of the plurality of mobile robots, and generating respective driving routes from the initial position to the final position of each of the plurality of mobile robots on the plurality of generated virtual driving lines based on the generated pattern of the driving behaviors.

The generating of the plurality of virtual driving lines may include determining a shape and width of the virtual driving line according to a size and a turning radius of each of the plurality of mobile robots to prevent a collision between the plurality of mobile robots in the driving space.

The pattern of the driving behaviors may include one of line driving and detour driving responsive to a presence or an absence of an obstacle located on the plurality of virtual driving lines, the line driving includes driving along one of the plurality of generated virtual driving lines, and the detour driving includes driving two or more of the plurality of generated virtual driving lines.

The line driving may include driving straight, turning left, and turning right and the detour driving includes driving around the obstacle along a clear virtual driving line that does not have the obstacle located thereon, the clear virtual driving line being adjacent to the obstacle among the plurality of generated virtual driving lines.

The pattern of the driving behaviors further may include determining whether one or more driving routes of the generated driving routes include a presence of a closed area in which the obstacle is located among the plurality of generated virtual driving lines as determined closed-area driving routes.

The method may further include regenerating new driving routes for the one or more determined closed-area driving routes responsive to a presence of the closed area during a driving operation of the plurality of mobile robots after the generating the driving routes.

The generating of the driving routes may include sequentially generating the driving routes based on a preset driving priority of each of the plurality of mobile robots.

The generating of the driving routes may include generating the driving routes from the initial position to the final position of each of the plurality of mobile robots in a driving space containing a plurality of intersection points.

After the generating of the driving routes, the method may include managing, responsive to the plurality of mobile robots initiating a driving operation on the generated driving routes, data about expected times for the plurality of mobile robots to pass through an intersection point on the generated driving routes, predicting, based on the expected time data, whether a collision will occur between the mobile robots, and regenerating one or more driving routes of the driving routes to avoid the collision between the mobile robots predicted to collide.

The predicting whether the collision will occur between the mobile robots may include predicting that the collision will occur when two or more of the plurality of mobile robots simultaneously pass through a same intersection point among the plurality of intersection points within a reference time.

The regenerating of the driving route may include calculating a priority of an intersection point at which the collision is predicted to occur and sequentially regenerating the driving routes of the mobile robots passing through the intersection point based on the calculated priority.

The calculating of the priority may include assigning a higher priority for an earlier time to pass through the intersection point at which the collision is predicted to occur from the managed expected time data.

The method may include controlling driving of the mobile robots predicted to cause the collision responsive to the predicting the collision will occur between the mobile robots.

In a general aspect, here is provided a system for generating driving routes of a plurality of mobile robots including one or more processors configured to execute instructions and a memory storing the instructions, wherein execution of the instructions configures the one or more processors to generate a plurality of virtual driving lines in a driving space, generate a pattern of driving behaviors of the mobile robots based on the plurality of virtual driving lines, input an initial position and a final position of each of the plurality of mobile robots, and generate respective driving routes from the initial position to the final position of each of the plurality of mobile robots on the plurality of generated virtual driving lines based on the generated pattern of the driving behaviors.

The generating may include determining a shape and width of the virtual driving line according to a size and a turning radius of each of the plurality of mobile robots to prevent a collision between the plurality of mobile robots in the driving space and the pattern of the driving behaviors may include one of line driving and detour driving responsive to a presence or an absence of an obstacle located on the plurality of virtual driving lines, and determining whether one or more of the driving routes include a presence of a closed area in which the obstacle is located across the plurality of generated virtual driving lines as determined closed-area driving routes, the line driving may include driving along one of the plurality of generated virtual driving lines and the detour driving may include driving along two or more of the plurality of generated virtual driving lines.

The processor may also be configured to monitor driving of the plurality of mobile robots after the driving route is generated and regenerate new driving routes for the determined closed-area driving routes responsive to the presence of the closed area during the driving of the plurality of mobile robots.

The generating the driving route may occur in a driving space containing a plurality of intersection points, and the processor may be further configured to manage, responsive to the plurality of mobile robots initiating a driving operation on the driving routes, data about expected times for the plurality of mobile robots to pass through an intersection point on the generated driving routes and predict, based on the expected time data, whether a collision will occur between the mobile robots.

The generating may include regenerating one or more of the driving routes to avoid the collision between the mobile robots predicted to collide.

The processor may also be configured to predict that the collision will occur when two or more of the plurality of mobile robots simultaneously pass through a same intersection point among the plurality of intersection points within a reference time.

The generating may include calculating a priority of an intersection point at which the collision is predicted to occur and sequentially regenerating the driving routes of the mobile robot passing through the intersection point based on the calculated priority.

Figure 1:
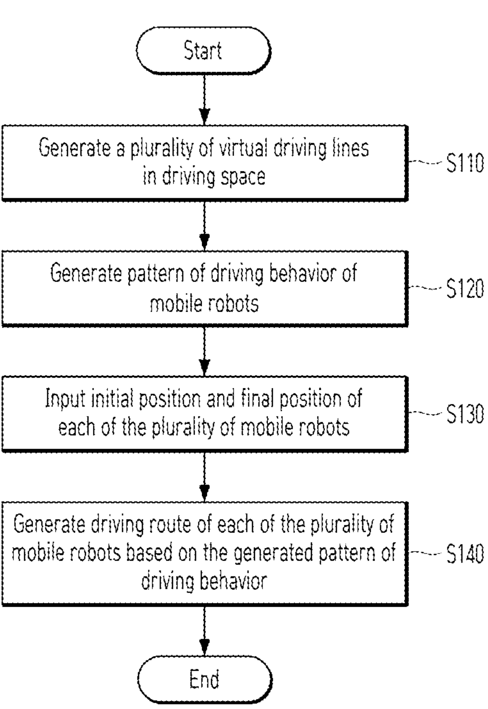
FIG. 1 is a diagram illustrating a method of generating a driving route according to one embodiment of the present disclosure.

Throughout the drawings and the detailed description, unless otherwise described or provided, the same, or like, drawing reference numerals may be understood to refer to the same, or like, elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Figure 2:
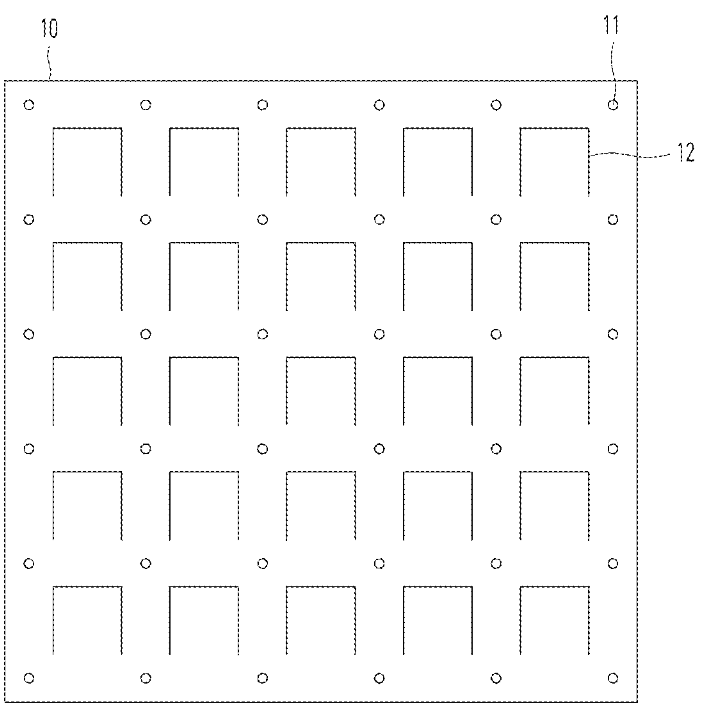
FIG. 2 is a diagram illustrating a driving space in the driving route generation method according to one embodiment of the present disclosure.
Figure 3:
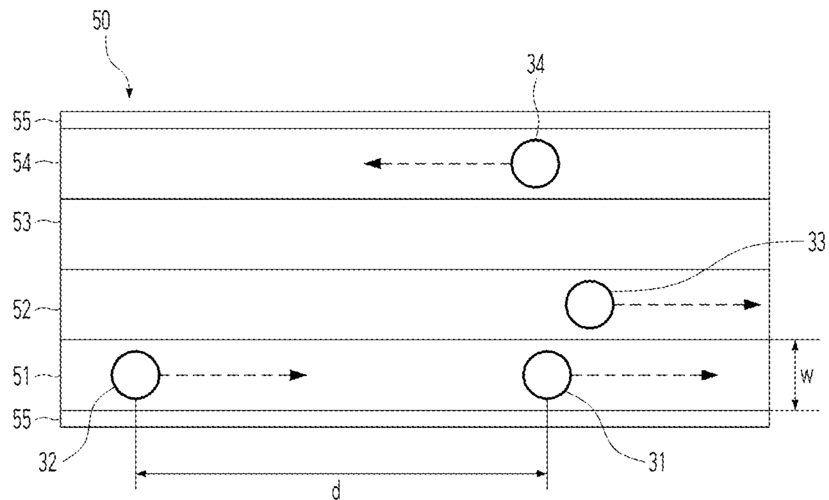
FIGS. 3 and 4 are diagrams illustrating various embodiments of multiple virtual driving lines in the driving route generation method according to one embodiment of the present disclosure.
Figure 4:
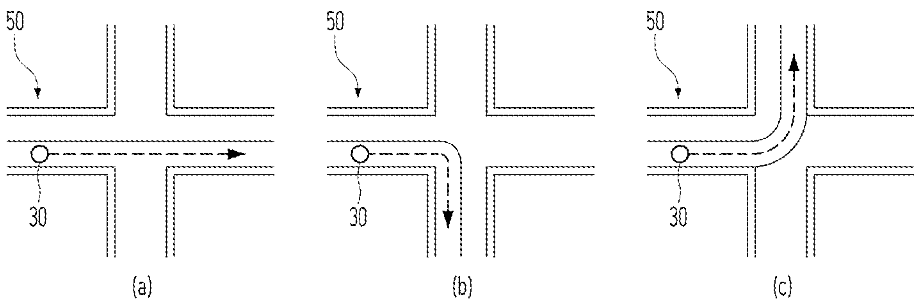
Figure 5:
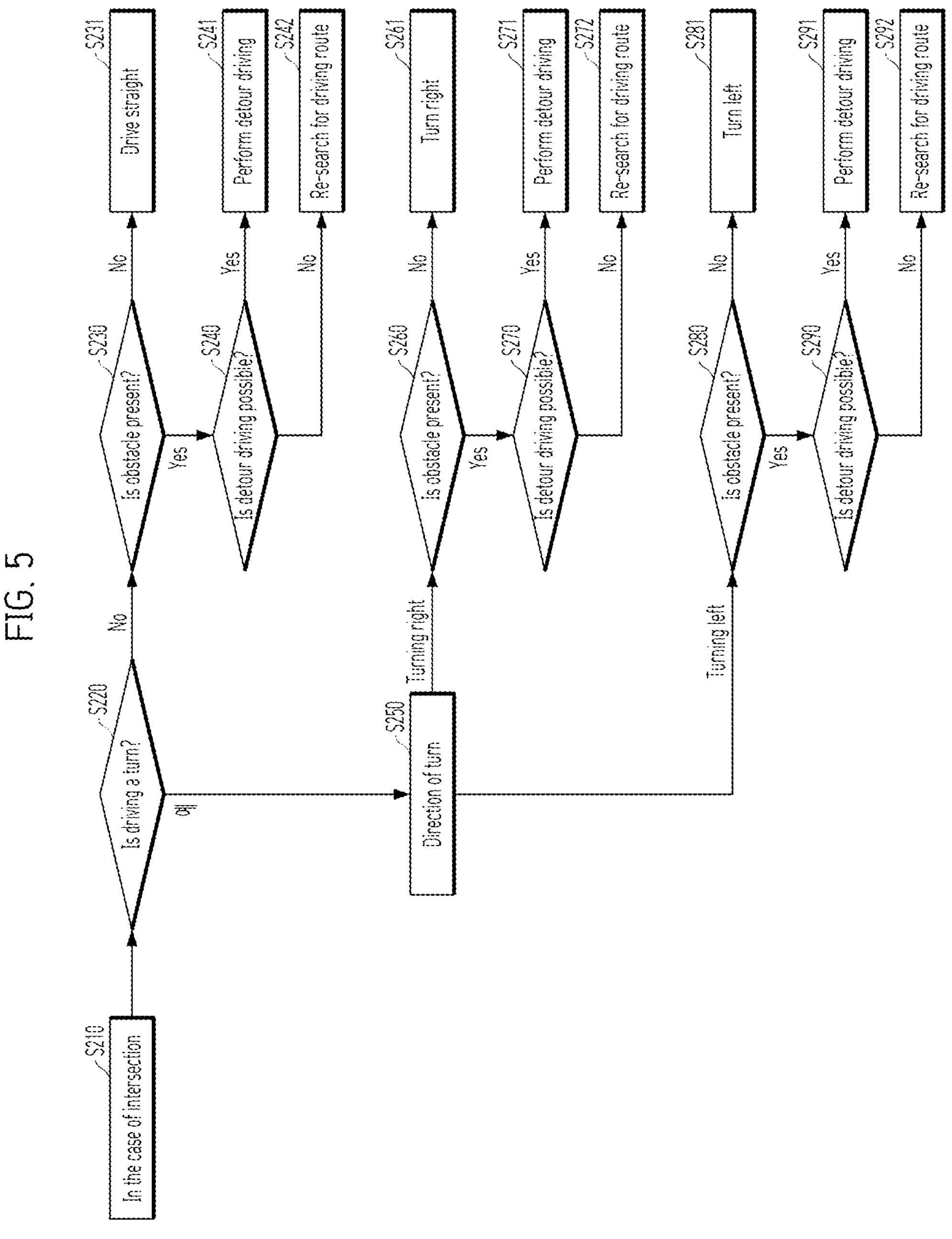
FIGS. 5 and 6 are diagrams illustrating a method of patterning driving behaviors in the driving route generation method according to one embodiment of the present disclosure.
Figure 6:
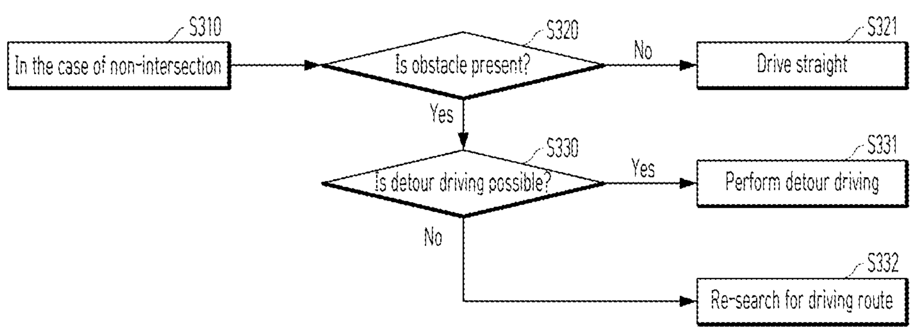
Figure 7:
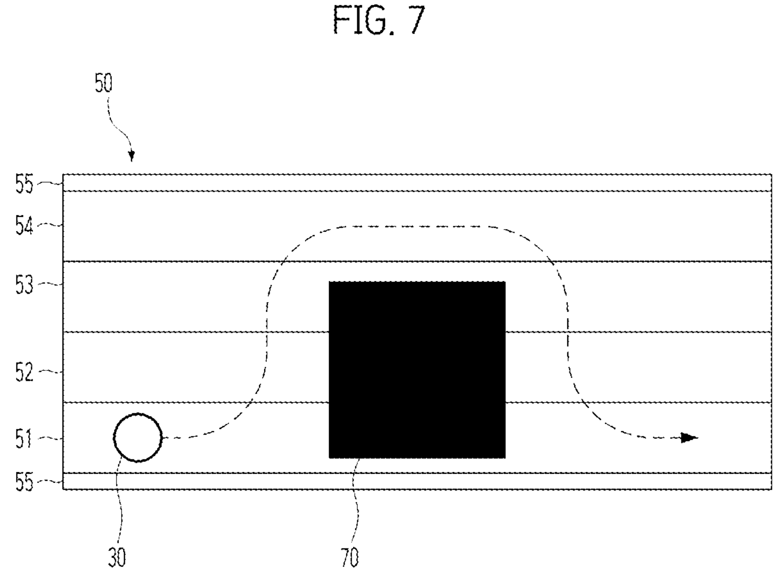
FIG. 7 is a diagram illustrating driving around an obstacle in the driving route generation method according to one embodiment of the present disclosure.

FIG. 1 is a diagram illustrating a method of generating a driving route according to one embodiment of the present disclosure. FIG. 2 is a diagram illustrating a driving space in the driving route generation method according to one embodiment of the present disclosure. FIGS. 3 and 4 are diagrams illustrating various embodiments of multiple virtual driving lines in the driving route generation method according to one embodiment of the present disclosure. FIGS. 5 and 6 are diagrams illustrating a method of patterning driving behaviors in the driving route generation method according to one embodiment of the present disclosure. FIG. 7 is a diagram illustrating driving by avoiding obstacles in the driving route generation method according to one embodiment of the present disclosure.

Referring to FIG. 1 and FIGS. 2 to 4, in a driving route generation method according to one embodiment of the present disclosure, a plurality of virtual driving lines 50 may first be generated in a driving space 10 (S110). Here, the driving space 10 is a space in which a plurality of mobile robots 30 can drive and perform various tasks. It may be a space in which a plurality of intersection points 11 and a plurality of task areas 12 are formed, as shown in FIG. 2.

Then, patterns of the driving behaviors of the mobile robots 30 may be generated based on the plurality of generated virtual driving lines (S120). Thereafter, an initial position and a final position of each of the plurality of mobile robots 30 may be input (S130), and a driving route from the initial position to the final position of each of the plurality of mobile robots 30 may be generated on the plurality of generated virtual driving lines 50 based on the generated patterns of the driving behaviors (S140).

More specifically, the generating of the plurality of virtual driving lines 50 may include determining a shape and width w of the virtual driving lines 50 in consideration of a safe distance in the driving space 10 and the size and turning radius of each of the plurality of mobile robots 30.

As shown in FIG. 3, in the driving route generation method according to one embodiment of the present disclosure, the plurality of virtual driving lines 50 may include, for example, a first driving line 51, a second driving line 52, a third driving line 53, and a fourth driving line 54. It may also include more or fewer driving lines, depending on the driving space 10.

Furthermore, as shown in FIG. 3, the driving directions of the plurality of mobile robots 30 may differ from each other based on the plurality of virtual driving lines 50. For example, the first driving line 51 and the second driving line 52 may be distinguished from the third driving line 53 and the fourth driving line 54 based on driving on the right side. Accordingly, the driving direction of the first mobile robot 31, the second mobile robot 32, and the third mobile robot 33 may be different from the driving direction of the fourth mobile robot 34. However, this is an embodiment of the present disclosure, and the plurality of mobile robots 30 may drive in a direction opposite to the driving directions described above, or the driving directions of the plurality of mobile robots 30 may all be the same on the plurality of virtual driving lines 50.

Also, as described above, in order to secure a safe distance in the driving space 10, safety lines 55 may be formed on both sides of the plurality of virtual driving lines 50 to prevent the mobile robot 30 from colliding with nearby facilities during driving.

Furthermore, in order to secure a safe distance from the driving space 10, the width w of each of the plurality of virtual driving lines 50 may be formed in consideration of the size of the mobile robot 30. Thereby, collisions between the plurality of mobile robots 30 driving the plurality of virtual driving lines 50 may be prevented from occurring. For example, as shown in FIG. 3, a collision may be prevented from occurring between a first mobile robot 31 driving on the first driving line 51 and a third mobile robot 33 driving on the second driving line 52.

Also, as shown in FIG. 4, the shape of the virtual driving line 50 may be determined in consideration of the turning radius of the mobile robot 30. By generating the pattern of the driving behavior of the mobile robot 30, which will be described later, the mobile robot 30 may drive straight, turn right, or turn left at an intersection. In this case, the shape of the virtual driving line 50 may be determined in consideration of the turning radius of the mobile robot 30.

FIGS. 5 and 6 are diagrams illustrating a method of generating a pattern of the driving behaviors in the driving route generation method according to one embodiment of the present disclosure. In particular, the driving route generation method according to one embodiment of the present disclosure may include generating a pattern of the driving behaviors of the mobile robots 30 based on the plurality of virtual driving lines 50 described above, which is intended to efficiently generate the driving routes of the plurality of mobile robots 30.

More specifically, referring to FIGS. 3 and 4 along with FIG. 7, the pattern of the driving behaviors may include line driving, in which the mobile robot 30 drives along any one of the plurality of generated virtual driving lines 50, and detour driving, in which the mobile robot 30 drives along at least two of the plurality of generated virtual driving lines 50, depending on the presence or absence of an obstacle 70 located on the plurality of generated virtual driving lines 50. The line driving may include driving straight, turning left, and turning right.

The detour driving may include driving around the obstacle 70 along a virtual driving line 50 where the obstacle 70 is not located and which is adjacent to the obstacle 70 among the plurality of generated virtual driving lines 50.

In this regard, FIG. 7 illustrates driving around the obstacle 70 in the driving route generation method according to one embodiment of the present disclosure. That is, in the driving route generation method according to one embodiment of the present disclosure, when the obstacle 70 is located across the first driving line 51, the second driving line 52, and the third driving line 53, the detour driving may be patterned to drive around the obstacle 70 along the fourth driving line 54 that does not have the obstacle 70 located thereon and is adjacent to the obstacle 70.

Also, the pattern of the driving behaviors may include re-exploring the driving route when there is a closed area where the obstacle 70 is located across the plurality of generated virtual driving lines 50. Here, the closed areas may refer to cases where the obstacle 70 is located across all of the first driving line 51, second driving line 52, third driving line 53, and fourth driving line 54, for example in FIG. 7, where the mobile robot 30 cannot perform either the line driving or the detour driving described above.

The method of generating a pattern of driving behaviors will be described in more detail with reference to FIGS. 5 and 6. FIG. 5 is a diagram illustrating a method of generating a pattern of driving behaviors in the case of an intersection (S210), and FIG. 6 is a diagram illustrating a method of generating a pattern of driving behaviors in the case of a non-intersection (S310).

As shown in FIG. 5, in the case of an intersection (S210), it may be determined whether the driving is a turn (S220). If the driving is not a turn, the presence or absence of the obstacle 70 located on the plurality of virtual driving lines 50 may be determined (S230). When the obstacle 70 is absent, the driving behavior may be patterned to drive straight (S231). When the obstacle 70 is present, it may be determined whether detour driving is possible (S240). When the detour driving is possible, the driving behavior may be patterned to perform the detour driving (S241). When the detour driving is not possible, i.e., in the case of the closed area described above, the driving behavior may be patterned to re-search for the driving route (S242).

In the case of turning, the driving behavior may be patterned by determining the direction of the turn (S250) to distinguish between a right turn or a left turn. In the case of the right turn, the presence or absence of the obstacle 70 may be determined (S260). When the obstacle 70 is absent, the driving behavior may be patterned to perform the right turn (S261). When the obstacle 70 is present, it may be determined whether detour driving is possible (S270). When the detour driving is possible, the driving behavior may be patterned to perform the detour driving (S271). When the detour driving is not possible, the driving behavior may be patterned to re-search for the driving route (S272).

In the case of the left turn, the presence or absence of the obstacle 70 may be determined (S280). When the obstacle 70 is not present, the driving behavior may be patterned to perform the left turn (S281). When the obstacle 70 is present, it may be determined whether the detour driving is possible (S290). When the detour driving is possible, the driving behavior may be patterned to perform the detour driving (S291). When the detour driving is not possible, the driving behavior may be patterned to re-search for the driving route (S292).

Then, as shown in FIG. 6, when the mobile robot is not at an intersection (S310), it may be determined whether the obstacle 70 located on the plurality of virtual driving lines 50 is present or absent (S320). When the obstacle 70 is absent, the driving behavior may be patterned to drive straight (S321). When the obstacle 70 is present, it may be determined whether the detour driving is possible (S330). When the detour driving is possible, the driving behavior may be patterned to perform the detour driving (S331). When the detour driving is not possible, the driving behavior may be patterned to re-search for the driving route (S332).

Thus, the driving route generation method according to one embodiment of the present disclosure may increase the efficiency of generating a driving route because it patterns the driving behavior of the mobile robot 30 as described above, and generates a driving route for each of the plurality of mobile robots 30 based on the patterned driving behavior.

Furthermore, in the driving route generation method according to one embodiment of the present disclosure, the driving route may be regenerated when there is a closed area as described above during the driving of the plurality of mobile robots 30 after the driving routes are generated. In this case, since the pattern of the driving behavior of the mobile robot 30 is generated as described above, the complexity of the calculation may be reduced by simplifying the generation of the driving routes, thereby solving the issue of the prior art that the amount of computation increases exponentially with the increase of the number of mobile robots 30, which causes limitations.

Figure 8:
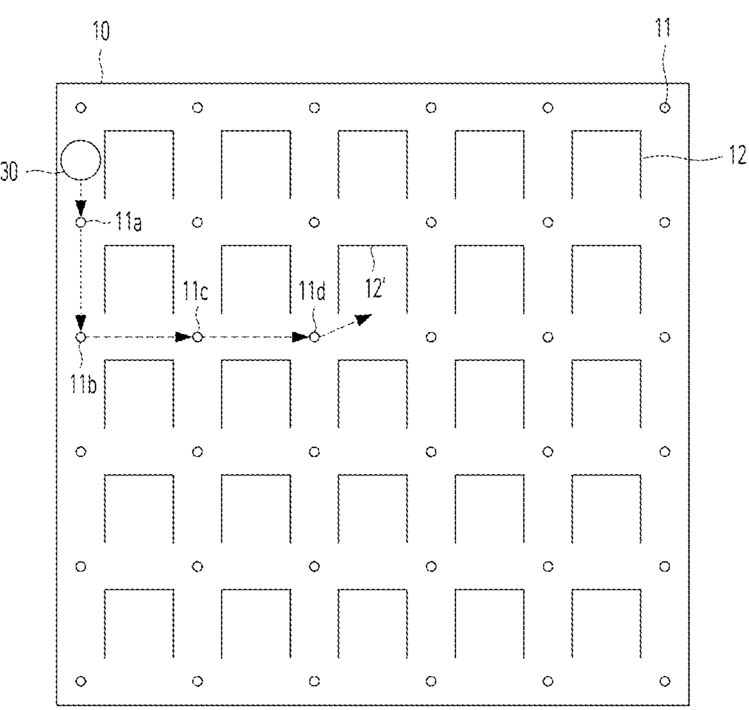
FIGS. 8 and 9 are diagrams illustrating a method of generating a driving route in the driving route generation method according to one embodiment of the present disclosure.
Figure 9:
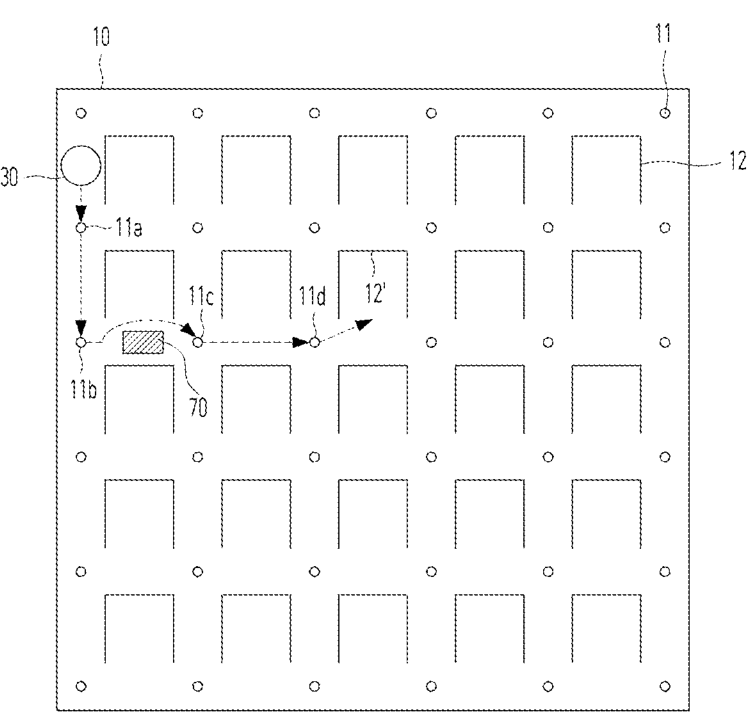

FIGS. 8 and 9 are diagrams illustrating a method of generating a driving route in the driving route generation method according to one embodiment of the present disclosure.

The driving route generation method according to one embodiment of the present disclosure may generate a driving route from an initial position to a final position of each of the plurality of mobile robots 30 on the plurality of virtual driving lines 50 generated based on the generated patterns of the driving behaviors as described above.

As shown in FIG. 8, the driving route from the initial position of the mobile robot 30 to the task area 12' at the final position may be generated to pass through a first intersection point 11*a*, a second intersection point 11*b*, a third intersection point 11*c*, and a fourth intersection point 11*d* using a pattern generation method according to the case of an intersection and the case of a non-intersection as described above with reference to FIGS. 5 and 6.

Unlike FIG. 8, FIG. 9 shows that an obstacle 70 is located between the second intersection point 11*b* and the third intersection point 11*c* in the driving space 10. However, since detour driving is possible, the driving route of the mobile robot 30 may be generated by taking a detour around the obstacle 70 as shown in FIG. 9.

Further, the driving route generation method according to one embodiment of the present disclosure may generate a driving route for each of the plurality of mobile robots 30 in the manner described above with reference to FIGS. 8 and 9.

In this case, the driving route generation method according to one embodiment of the present disclosure may secure a safe distance between the mobile robots 30 traveling on the same driving line among the plurality of virtual driving lines 50 to prevent collisions from occurring.

That is, by generating a driving route with a separation distance d maintained between a first mobile robot 31 and a second mobile robot 32 driving on the same driving line, the first driving line 51, as shown in FIG. 3, a safety distance between the first mobile robot 31 and the second mobile robot 32 may be secured to prevent a collision.

In particular, in the driving route generation method according to one embodiment of the present disclosure, the driving routes may be sequentially generated based on a preset driving priority of each of the plurality of mobile robots 30. Furthermore, the driving routes may be generated in consideration of the speed of each of the plurality of mobile robots 30 and the time to pass through each of the plurality of intersection points 11. Thereby, the plurality of mobile robots 30 may be prevented from reaching a deadlock, thereby addressing the conventional issue of failing to achieve a desired task purpose due to the deadlock.

Furthermore, in the driving route generation method according to one embodiment of the present disclosure, when a closed area occurs during the driving of the plurality of mobile robots 30 after the driving route of each of the plurality of mobile robots 30 has been generated as described above, driving routes may be regenerated.

Figure 10:
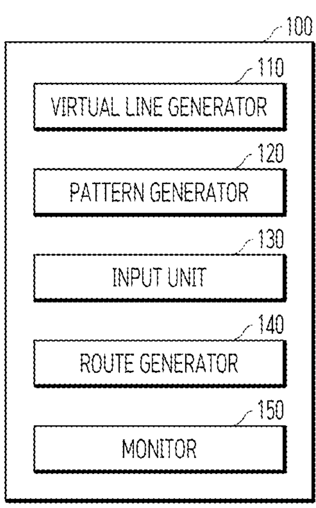
FIG. 10 is a block diagram of a driving route generation system according to one embodiment of the present disclosure.

FIG. 10 is a block diagram of a driving route generation system according to one embodiment of the present disclosure.

The driving route generation system 100 according to one embodiment of the present disclosure may include a virtual line generator 110, a pattern generator 120, an input unit 130, a route generator 140, and a monitor 150.

Referring to FIG. 10 in conjunction with FIGS. 1 to 9, the virtual line generator 110 may generate a plurality of virtual driving lines 50 in the driving space 10. More specifically, the virtual line generator 110 may determine the shape and width of the virtual driving lines 50, taking into account the safe distance in the driving space 10 and the size and turning radius of each of the plurality of mobile robots 30, as described above with reference to FIGS. 3 and 4.

The pattern generator 120 may generate a pattern of the driving behaviors of the mobile robots 30 based on the plurality of virtual driving lines 50 generated by the virtual line generator 110.

More specifically, the pattern generator 120 may generate patterns including line driving representing driving on any one of the plurality of generated virtual driving lines 50, detour driving representing driving along at least two of the plurality of generated virtual driving lines 50, and re-search for a driving route when there is a closed area where the obstacle 70 is located across the plurality of virtual driving lines 50, based on the presence or absence of the obstacle 70 on the plurality of generated virtual driving lines 50.

Here, the line driving may include driving straight, turning left, and turning right, as described above. Also, the detour driving may include driving around the obstacle 70 along a virtual driving line 50 where the obstacle 70 is not located and which is adjacent to the obstacle 70 among the plurality of generated virtual driving lines 50.

An initial position and a final position of each of the plurality of mobile robots 30 may be input through the input unit 130. Then, the route generator 140 may generate a driving route from the initial position to the final position of each of the plurality of mobile robots 30 on the plurality of virtual driving lines 50 generated based on the driving behaviors whose pattern is generated by the pattern generator 120.

The monitor 150 may monitor the driving of the plurality of mobile robots 30 after the driving routes are generated. Here, the route generator 140 may regenerate the driving routes when there is a closed area during the driving of the plurality of mobile robots 30 monitored through the monitor 150.

It should be noted that the block diagram of the driving route generation system 100 shown in FIG. 10 is merely a block diagram for one embodiment of the present disclosure, and the components in the block diagram may be integrated, divided, or omitted according to the specifications of the driving route generation system 100 that is actually implemented. In other words, two or more components may be integrated into one component, or one component may be subdivided into two or more components, as needed. Further, it should be noted that the functions performed by the respective blocks are intended to illustrate embodiments of the present disclosure, and the specific operations or devices thereof are not intended to limit the scope of the present disclosure.

Figure 11:
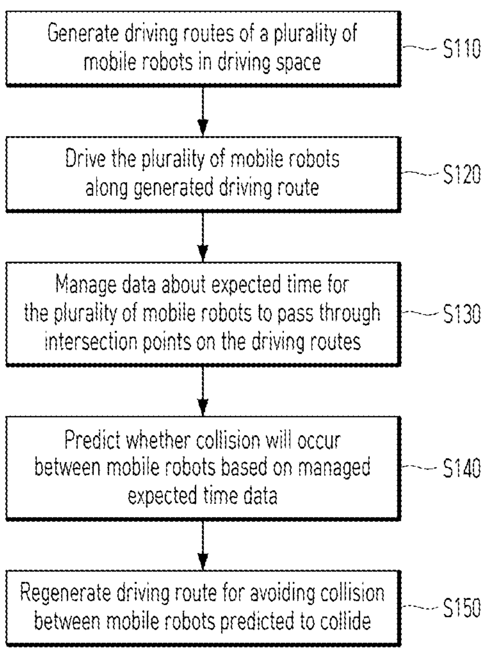
FIG. 11 is a diagram illustrating a method of generating a driving route according to one embodiment of the present disclosure.
Figure 12:
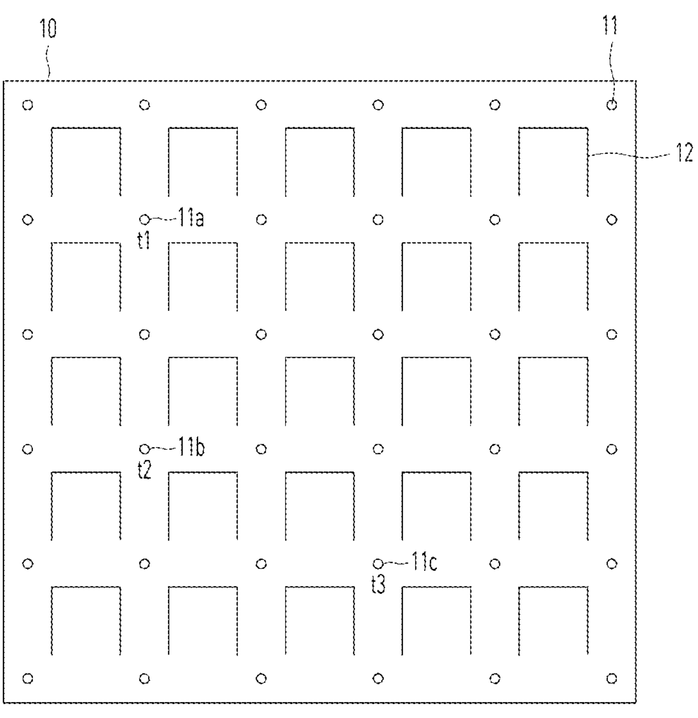
FIG. 12 is a diagram illustrating a driving space in the driving route generation method according to one embodiment of the present disclosure.
Figure 13:
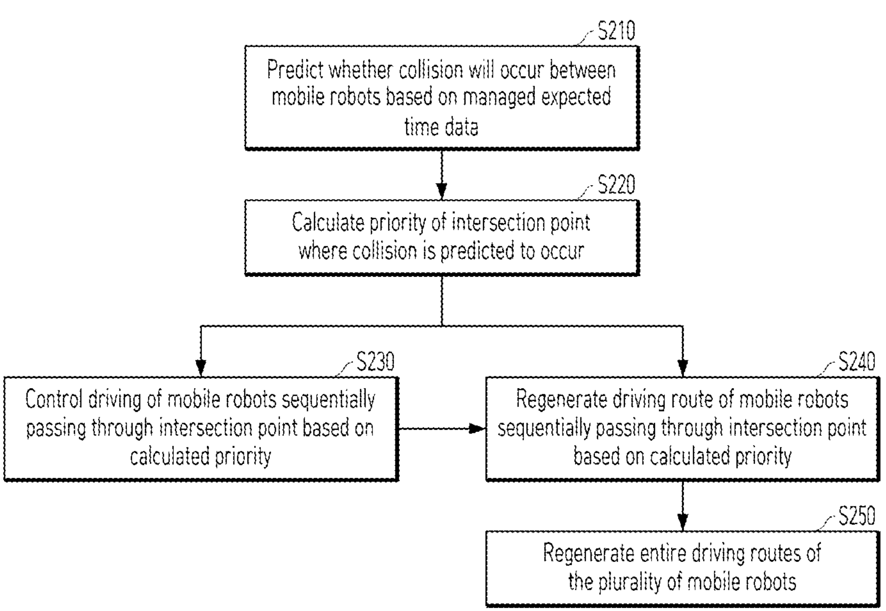
FIG. 13 is a diagram more specifically illustrating regenerating a driving route in the driving route generation method according to one embodiment of the present disclosure.

FIG. 11 is a diagram illustrating a method of generating a driving route according to one embodiment of the present disclosure. FIG. 12 is a diagram illustrating a driving space in the driving route generation method according to one embodiment of the present disclosure. FIG. 13 is a diagram more specifically illustrating regenerating a driving route in the driving route generation method according to one embodiment of the present disclosure.

FIG. 11 is a diagram illustrating a method of generating a driving route according to one embodiment of the present disclosure. Referring to FIGS. 11 and 12 together, a driving route from an initial position to a final position of each of the plurality of mobile robots in the driving space 10 including a plurality of intersection points may first be generated (S110). Here, the driving space 10 is a space in which the plurality of mobile robots can drive and various tasks can be performed. As shown in FIG. 12, multiple intersection points 11 and multiple task areas 12 may be formed in the driving space 10.

Then, based on information about the mobile robots, a driving route of a mobile robot may be generated. For example, an optimal driving route from the initial position of the mobile robot to the final position of the mobile robot may be generated based on the information about the type, size, speed, and turning radius of the mobile robot and the content of the task to be performed. After the driving route of the individual mobile robot is generated, the driving route of each of the plurality of mobile robots may be generated to avoid collisions between the plurality of mobile robots driving in the driving space 10.

Then, the plurality of mobile robots may drive on the generated driving routes (S120). When the plurality of mobile robots starts driving on the generated driving routes, data about the expected time for the plurality of mobile robots to pass through the intersection points 11 on the generated driving routes may be managed (S130). While the plurality of mobile robots is driving, environmental changes may occur in the driving space 10. For example, new obstacles may appear on the generated driving routes, or a time delay may occur due to a delay of a task in the task area 12 of the mobile robots.

For these reasons, collisions between the mobile robots or deadlocks may occur during actual driving after generating the driving routes of the plurality of mobile robots. Therefore, the present disclosure is aimed at regenerating the driving routes such that abnormal situations that may occur during the driving of the plurality of mobile robots can be coped with.

To this end, the driving route generation method according to one embodiment of the present disclosure may include managing the time at which each of the plurality of mobile robots passes or is expected to pass through the plurality of intersection points 11 on the generated driving route as expected time data.

Then, based on the managed expected time data, it may be predicted whether a collision will occur between the mobile robots (S140). Here, predicting whether a collision will occur between the moving robots may include predicting that a collision will occur when at least two mobile robots among the plurality of mobile robots are to simultaneously pass through the same intersection point 11 among the plurality of intersection points 11 within a reference time.

In one embodiment, referring to FIG. 12 in conjunction with FIG. 11, at least two mobile robots pass simultaneously through the first intersection point 11*a*, the second intersection point 11*b*, and the third intersection point 11*c* within the reference time according to the management of the above-described expected time data. Accordingly, a collision is predicted to occur. Here, the reference time may be a certain time within which a collision occurs between the mobile robots if the mobile robots simultaneously pass through the intersection point 11 within the reference time, considering the size, entry direction, and speed of the mobile robots.

Thereafter, a driving route for avoiding the collision between the mobile robots which are predicted to collide may be regenerated (S150). A method of regenerating the driving route will be described in detail below.

FIG. 13 is a diagram more specifically illustrating regenerating a driving route in the driving route generation method according to one embodiment of the present disclosure.

As described above with reference to FIGS. 11 and 12, the driving route generation method according to one embodiment of the present disclosure may include predicting whether a collision will occur between the moving robots based on the managed expected time data (S210), and calculating a priority of the intersection point 11 where the collision is predicted to occur (S220). Here, calculating the priority may include calculating a higher priority for an earlier time to pass through the intersection point 11 where a collision is predicted to occur based on the managed expected time data.

Referring now to FIG. 12, when a collision is predicted to occur between the mobile robots at the first intersection point 11*a*, the second intersection point 11*b*, and the third intersection point 11*c*, as described above, the time at which the collision is predicted to occur may be measured at each intersection point 11.

For example, when the collision predicted time t1 measured at the first intersection point 11*a* is 5 seconds later, the collision predicted time t2 measured at the second intersection point 11*b* is 2 seconds later, and the collision predicted time t3 measured at the third intersection point 11*c* is 10 seconds later, the second intersection point 11*b* has the highest priority, followed by the first intersection point 11*a*, and the third intersection point 11*c* has the lowest priority.

After calculating the priority, the driving of the mobile robots that sequentially pass through the intersection points 11 may be controlled based on the calculated priorities (S230). Here, controlling the driving of the mobile robots may include adjusting the speed of the mobile robots.

Alternatively, after calculating the priorities, the driving routes of the mobile robot sequentially passing through the intersection points 11 may be regenerated based on the calculated priorities (S240). Moreover, the driving route generation method according to one embodiment of the present disclosure may control the driving of the mobile robots such that the mobile robots travel on the regenerated driving routes.

Additionally, in the driving route generating method according to one embodiment of the present disclosure, when a collision between the mobile robots cannot be avoided or a deadlock occurs between the mobile robots despite controlling the driving of the mobile robots or generating driving routes of the mobile robots as described above, the entire driving routes of the plurality of mobile robots may be regenerated (S250).

Figure 14:
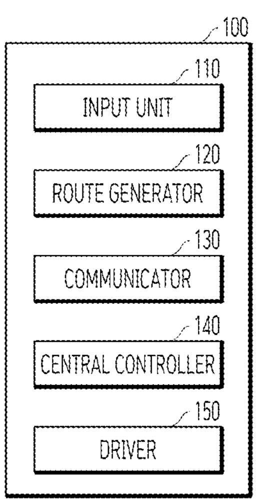
FIG. 14 is a block diagram of a driving route generation system according to one embodiment of the present disclosure.

FIG. 14 is a block diagram of a driving route generation system 100 according to one embodiment of the present disclosure.

The driving route generation system 100 according to one embodiment of the present disclosure may include an input unit 110, a route generator 120, a communicator 130, a central controller 140, and a driver 150.

Referring to FIG. 14 in conjunction with FIGS. 11 to 13, the input unit 110 may be responsible for inputting information about a mobile robot. For example, information about the type, size, speed, and turning radius of the mobile robot and the content of the task to be performed. In addition, an initial position and a final position of the mobile robot may be input.

The route generator 120 may serve to generate a driving route from the initial position to the final position of each of the plurality of mobile robots in the driving space 10 including a plurality of intersection points 11. Thus, the route generator 120 may generate a driving route for each of the plurality of mobile robots traveling in the driving space 10 based on information about the mobile robots received through the input unit 110. The communicator 130 may serve to communicate the driving route generated by the route generator 120 to the plurality of mobile robots.

When the plurality of mobile robots starts driving on the driving routes generated by the route generator 120, the central controller 140 may serve to manage data about the expected time for the plurality of mobile robots to pass through the intersection points 11 on the generated driving routes, and predict whether a collision will occur between the mobile robots based on the managed expected time data.

In addition, the central control unit 140 may serve to predict that a collision will occur when at least two mobile robots among the plurality of mobile robots are to simultaneously pass through the same intersection point 11 among the plurality of intersection points 11 within a reference time, as described above.

The route generator 120 may serve to regenerate, through the central controller 140, a driving route for avoiding a collision between the mobile robots which are predicted to collide. More specifically, the route generator 120 may calculate a priority of the intersection point 11 at which a collision is predicted to occur, and generate the driving routes of the mobile robots sequentially passing through the intersection point 11 based on the calculated priority.

Here, calculating the priority may include calculating a higher priority for an earlier time to pass through the intersection point 11 where a collision is predicted to occur based on the expected time data managed by the route generator 120.

The driver 150 may control the driving of a mobile robot where a collision is predicted to occur as described above. Here, controlling the driving of the mobile robot by the driver 150 may include adjusting the speed of the mobile robot. Further, controlling the driving of the mobile robot by the driver 150 may include controlling the driving of the mobile robot such that the mobile robot travels on the regenerated driving route.

It should be noted that the block diagram of the driving route generation system 100 shown in FIG. 14 is merely a block diagram for one embodiment of the present disclosure, and the components in the block diagram may be integrated, divided, or omitted according to the specifications of the driving route generation system 100 that is actually implemented. In other words, two or more components may be integrated into one component, or one component may be subdivided into two or more components, as needed. Further, it should be noted that the functions performed by the respective blocks are intended to illustrate embodiments of the present disclosure, and the specific operations or devices thereof are not intended to limit the scope of the present disclosure.

In view of the above, with a driving route generation method and system according to the present disclosure, driving routes of multiple mobile robots may be efficiently generated by generating multiple virtual lines in a driving space and generating a pattern of the driving behaviors of the mobile robots. Furthermore, by generating a pattern of the driving behaviors of the mobile robots, the driving route generation may be simplified to reduce computational complexity, and driving routes may be regenerated in real time. Further, by predicting a collision will occur between multiple mobile robots traveling, a driving route for avoiding a collision between mobile robots that are predicted to collide may be regenerated. Furthermore, by predicting, in real time, whether a collision will occur between multiple mobile robots, a driving route may be regenerated to cope with abnormal situations during the driving.

Various embodiments of the present disclosure do not list all available combinations but are for describing a representative aspect of the present disclosure, and descriptions of various embodiments may be applied independently or may be applied through a combination of two or more.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of generating driving routes of a plurality of mobile robots, the method comprising:

generating a plurality of virtual driving lines in a driving space;

generating a pattern of driving behaviors of the mobile robots based on the plurality of generated virtual driving lines;

inputting an initial position and a final position of each of the plurality of mobile robots;

generating respective driving routes from the initial position to the final position of each of the plurality of mobile robots on the plurality of generated virtual driving lines based on the generated pattern of the driving behaviors; and controlling driving of the plurality of mobile robots along the respective generated driving routes, wherein the generating of the driving routes occurs in a driving space containing a plurality of intersection points, and wherein, responsive to the plurality of mobile robots initiating a driving operation on the generated driving routes, the method further comprises:

managing data about expected times for the plurality of mobile robots to pass through an intersection point on the generated driving routes;

predicting, based on the expected time data, that a collision will occur when two or more of the plurality of mobile robots simultaneously pass through a same intersection point among the plurality of intersection points within a reference time;

calculating a priority of the intersection point at which the collision is predicted to occur by assigning a higher priority for an earlier time to pass through the intersection point from the managed expected time data; and controlling driving of the mobile robots predicted to collide based on the calculated priority by adjusting a speed of the mobile robots.

2. The method of claim 1, wherein the generating of the plurality of virtual driving lines comprises:

determining a shape and width of the virtual driving line according to a size and a turning radius of each of the plurality of mobile robots to prevent a collision between the plurality of mobile robots in the driving space.

3. The method of claim 1, wherein the pattern of the driving behaviors includes one of line driving and detour driving responsive to a presence or an absence of an obstacle located on the plurality of virtual driving lines, wherein the line driving includes driving along one of the plurality of generated virtual driving lines, and wherein the detour driving includes driving two or more of the plurality of generated virtual driving lines.

4. The method of claim 3, wherein the line driving includes driving straight, turning left, and turning right, and wherein the detour driving includes:

driving around the obstacle along a clear virtual driving line that does not have the obstacle located thereon, the clear virtual driving line being adjacent to the obstacle among the plurality of generated virtual driving lines.

5. The method of claim 3, wherein the pattern of the driving behaviors further includes:

determining whether one or more driving routes of the generated driving routes include a presence of a closed area in which the obstacle is located among the plurality of generated virtual driving lines as determined closed-area driving routes.

6. The method of claim 5, wherein the method further comprises:

regenerating new driving routes for the one or more determined closed-area driving routes responsive to a presence of the closed area during a driving operation of the plurality of mobile robots after the generating the driving routes.

7. The method of claim 1, further comprising regenerating at least one of the generated driving routes to avoid the collision, wherein the regenerating comprises sequentially regenerating the driving routes of the mobile robots passing through the intersection point based on the calculated priority.

8. A system for generating driving routes of a plurality of mobile robots, the system comprising:

one or more processors configured to execute instructions; and a memory storing the instructions, wherein execution of the instructions configures the one or more processors to:

generate a plurality of virtual driving lines in a driving space;

generate a pattern of driving behaviors of the mobile robots based on the plurality of virtual driving lines;

input an initial position and a final position of each of the plurality of mobile robots; and generate respective driving routes from the initial position to the final position of each of the plurality of mobile robots on the plurality of generated virtual driving lines based on the generated pattern of the driving behaviors; and control driving of the plurality of mobile robots along the respective generated driving routes, wherein the generating of the driving routes occurs in a driving space containing a plurality of intersection points, and wherein execution of the instructions further configures the one or more processors, responsive to the plurality of mobile robots initiating a driving operation on the generated driving routes, to:

manage data about expected times for the plurality of mobile robots to pass through an intersection point on the generated driving routes;

predict, based on the expected time data, that a collision will occur when two or more of the plurality of mobile robots simultaneously pass through a same intersection point among the plurality of intersection points within a reference time;

calculate a priority of the intersection point at which the collision is predicted to occur by assigning a higher priority for an earlier time to pass through the intersection point from the managed expected time data; and control driving of the mobile robots predicted to collide based on the calculated priority by adjusting a speed of the mobile robots.

9. The system of claim 8, wherein the generating comprises determining a shape and width of the virtual driving line according to a size and a turning radius of each of the plurality of mobile robots to prevent a collision between the plurality of mobile robots in the driving space, wherein the pattern of the driving behaviors includes:

one of line driving and detour driving responsive to a presence or an absence of an obstacle located on the plurality of virtual driving lines; and determining whether one or more of the driving routes include a presence of a closed area in which the obstacle is located across the plurality of generated virtual driving lines as determined closed-area driving routes, wherein the line driving includes driving along one of the plurality of generated virtual driving lines, and wherein the detour driving includes driving along two or more of the plurality of generated virtual driving lines.

10. The system of claim 9, wherein the processor is further configured to:

monitor driving of the plurality of mobile robots after the driving route is generated; and regenerate new driving routes for the determined closed-area driving routes responsive to the presence of the closed area during the driving of the plurality of mobile robots.

11. The system of claim 8, wherein execution of the instructions further configures the one or more processors to regenerate at least one of the generated driving routes to avoid the collision, wherein the regenerating comprises sequentially regenerating the driving routes of the mobile robots passing through the intersection point based on the intersection point.

* * * * *